United States Patent
Tanaka et al.

(10) Patent No.: US 6,858,294 B1
(45) Date of Patent: Feb. 22, 2005

(54) COATING FLUID FOR FORMING HARD COATING AND SUBSTRATES COVERED WITH HARD COATING

(75) Inventors: Hirokazu Tanaka, Kitakyushu (JP); Masafumi Hirai, Kitakyushu (JP); Chiemi Murakami, Kitakyushu (JP)

(73) Assignee: Catalyst & Chemicals Industries Co., Ltd. (JP)

( * ) Notice: Subject to any disclaimer, the term of this patent is extended or adjusted under 35 U.S.C. 154(b) by 0 days.

(21) Appl. No.: 09/581,604

(22) PCT Filed: Dec. 14, 1998

(86) PCT No.: PCT/JP98/05638

§ 371 (c)(1),
(2), (4) Date: Jun. 15, 2000

(87) PCT Pub. No.: WO99/31185

PCT Pub. Date: Jun. 24, 1999

(30) Foreign Application Priority Data

Dec. 16, 1997 (JP) .............................. 9/346187

(51) Int. Cl.[7] .............................. B32B 5/16; B32B 9/04; C08K 3/10; C08K 3/34; C08K 3/22
(52) U.S. Cl. ..................... 428/329; 428/331; 428/447; 106/436; 106/439; 106/456; 106/457; 524/413; 524/435; 524/492; 524/497
(58) Field of Search ................................ 428/323, 328, 428/329, 331, 332, 446, 447, 500, 502; 106/456, 457, 439, 436; 252/182.14, 182.3, 182.33; 524/435, 413, 492, 497

(56) References Cited

U.S. PATENT DOCUMENTS 5,963,373 A * 10/1999 Kayanoki .................... 359/581
6,077,341 A * 6/2000 Terase et al. ................ 106/482

FOREIGN PATENT DOCUMENTS

| JP | 63247702 | 10/1988 |
| JP | 02178219 | 7/1990 |
| JP | 02264902 | 10/1990 |
| JP | 03068901 | 3/1991 |
| JP | 05002102 | 9/1993 |

* cited by examiner

Primary Examiner—Sheeba Ahmed
(74) Attorney, Agent, or Firm—Webb Ziesenheim Logsdon Orkin & Hanson, P.C.

(57) ABSTRACT

A coating liquid for forming on a substrate surface a hard coat film which exhibits a high refractive index, being excellent in resistance to hot water, weather resistance, scuffing resistance, attrition resistance and dye affinity, and which does not exhibit photochromism, is provided.

A coating liquid for forming a hard coat film, comprises a matrix-forming component and composite metal oxide particles of 1 to 100 nm average particle size, composed either of an iron oxide component and a titanium oxide component used at a specified ratio or an iron oxide component, a titanium oxide component and a silica component used at a specified ratio. A substrate coated with a hard coat film is formed by applying the above coating liquid to the substrate surface and effecting drying.

14 Claims, 1 Drawing Sheet

COATING FLUID FOR FORMING HARD COATING AND SUBSTRATES COVERED WITH HARD COATING

TECHNICAL FIELD

The present invention relates to a coating liquid for forming a hard coat film on a surface of a substrate such as a glass, a plastic or the like. More particularly, the present invention relates to a coating liquid for forming a hard coat film which has a high refractive index and a high transparency, being excellent in resistance to hot water, weather resistance, scuffing resistance, attrition resistance (abrasion resistance) and dye affinity (dye receptivity) and adherence to a substrate, and which does not exhibit photochromism.

Furthermore, the present invention relates to a substrate coated with a hard coat film which is formed from the above coating liquid.

BACKGROUND OF THE INVENTION

Various hard coat films and methods of forming the hard coat films have been proposed with the intent to provide a hard coat film having a high refractive index on a surface of a substrate such as a transparent plastic or glass.

For example, Japanese Patent Laid-open Publication No. 63(1988)-247702 discloses a coating film which contains a specified organosilicon compound and particles of titanium oxide. Further, Japanese Patent Laid-open Publication No. 2(1990)-264902 discloses a hard coat film comprising an organosilicon compound and fine particles of a composite metal oxide consisting of cerium oxide and titanium oxide. Still further, Japanese Patent Laid-open Publication No. 3(1991)-68901 discloses a hard coat film comprising fine particles, which the fine particles obtained by treating fine particles of titanium oxide with silica and/or an organosilicon compound, and an organosilicon compound.

However, the coating film described in Japanese Patent Laid-open Publication No. 63(1988)-247702 has drawbacks in that the weather resistance thereof is poor, the coating film discolors with the passage of time and also the adherence to substrates is not satisfactory. The hard coat films described in Japanese Patent Laid-open Publication Nos. 2(1990)-264902 and 3(1991)-68901 have drawbacks in that the weather resistance thereof, although slightly improved as compared with that of the coating film described in Japanese Patent Laid-open Publication No. 63(1988)-247702, is still unsatisfactory and that further the scuffing resistance and attrition resistance of the hard coat films are poor.

In Japanese Patent Application No. 3(1991)-152098 (Japanese Patent Laid-open Publication No. 5(1993)-2102), the inventors proposed a hard coat film containing fine particles of a compound oxide consisting of titanium oxide and iron oxide or fine particles of a compound oxide consisting of titanium oxide, iron oxide and silica, for resolving the above problems. In the hard coat film described in the Japanese Patent Laid-open Publication No. 5(1993)-2102, fine particles of a composite metal oxide wherein the weight ratio of iron oxide to titanium oxide, $Fe_2O_3/TiO_2$, is in the range of 0.005 to 1.0 are used as a component for forming the hard coat film.

However, the hard coat film described in the Japanese Patent Laid-open Publication No. 5(1993)-2102, although improved in weather resistance, may be slightly tinted with a yellowish hue because the iron oxide per se is yellowish.

Further, there is the problem that the above composite metal oxide containing iron oxide is photochromic, so that when the hard coat film containing the composite metal oxide is irradiated with, for example, ultraviolet rays, the tone of the hard coat film per se is changed. These coloring and tone changes are generally canceled when the irradiation is terminated. However, there are occasions in which the restoration to the original state is difficult in films containing photochromic metal oxide.

Still further, when an antireflective multicoat layer is formed on the above hard coat film, there occurs the problem that the restoration of the discolored hard coat film to the original tone is inhibited.

The present invention has been accomplished with a view to solving the above problems of the prior art. Accordingly, the present invention provides a coating liquid for forming a hard coat film which has a high refractive index and a high transparency, being excellent in resistance to hot water, weather resistance, scuffing resistance, attrition resistance, dye affinity, and adherence to a substrate, and which does not exhibit photochromism. The present invention also provides a substrate coated with a hard coat film wherein the above hard coat film with excellent properties is provided on a substrate surface.

BACKGROUND OF THE INVENTION

The first coating liquid for forming a hard coat film according to the present invention comprises a matrix-forming component and particles of a composite metal oxide, wherein the composite metal oxide particles are composed of an iron oxide component and a titanium oxide component, the weight ratio $Fe_2O_3/TiO_2$ being in the range of 0.0005 to less than 0.005, provided that $Fe_2O_3$ and $TiO_2$ represent the weight in terms of $Fe_2O_3$ of the iron oxide component and the weight in terms of $TiO_2$ of the titanium oxide component, respectively, and wherein the compound oxide particles have an average particle size ranging from 1 to 100 nm.

The second coating liquid for forming a hard coat film according to the present invention comprises a matrix-forming component and particles of a compound oxide (double oxide, composite oxide), wherein the composite metal oxide particles are composed of iron oxide, titanium oxide and silica, the weight ratio $Fe_2O_3/TiO_2$ being in the range of 0.0005 to less than 0.005, and the weight ratio $SiO_2/(Fe_2O_3+TiO_2)$ being in the range of 0.001 to 1.0, provided that $Fe_2O_3$, $TiO_2$ and $SiO_2$ represent the weight in terms of $Fe_2O_3$ of iron oxide, the weight in terms of $TiO_2$ of titanium oxide and the weight in terms of $SiO_2$ of silica, respectively, and wherein the compound oxide particles have an average particle size ranging from 1 to 100 nm.

In the above first and second coating liquid for forming a hard coat film, it is preferred that the composite metal oxide particles have their surface modified with an organosilicon compound.

The substrate coated with a hard coat film according to the present invention is formed by applying to the substrate surface the above coating liquid for forming a hard coat film.

This substrate coated with a hard coat film may have its surface overcoated with an antireflection film.

DETAILED DESCRIPTION OF THE INVENTION

Figure 1:
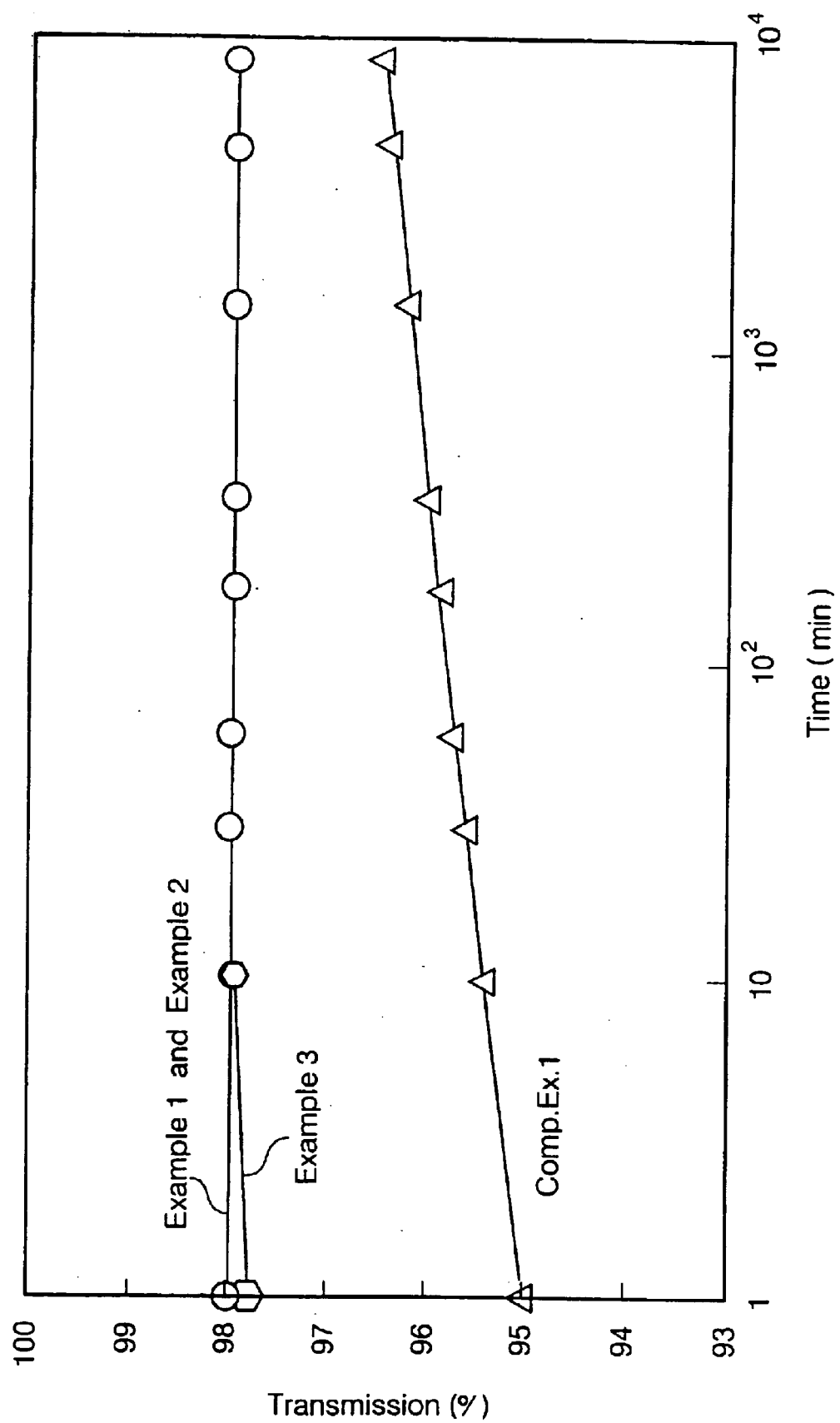
FIG. 1 shows the photochromism of a hard coat film overcoated with an antireflection coating film.

The first and second coating liquids for forming a hard coat film and substrate coated with a hard coat film according to the present invention will be described below in detail.

First Coating Liquid for Forming a Hard Coat Film

The first coating liquid for forming a hard coat film according to the present invention (hereinafter referred to as "coating liquid (A)") will now be described.

The coating liquid (A) contains fine particles of a composite metal oxide composed of an iron oxide component and a titanium oxide component, a matrix-forming component and an organic solvent.

Composite Metal Oxide Particle

Fine particles of a composite metal oxide composed of an iron oxide component and a titanium oxide component are used as the above compound oxide particles.

The terminology "composite metal oxide composed of an iron oxide component and a titanium oxide component" used herein means any of the following:

(a) a composite metal oxide consisting of iron oxide and titanium oxide chemically bonded together, (b) a solid solution consisting of oxides of iron and titanium, and (c) a mixture of substances (a) and (b) mentioned above.

Each of the above iron oxide and titanium oxide may be in the form of a hydrate or a hydroxide.

The average particle size of compound oxide particles contained in the coating liquid (A) is preferably in the range of 1 to 100 nm, still preferably 2 to 60 nm.

The hard coat film obtained from the coating liquid containing composite metal oxide particles whose average particle size exceeds 100 nm is likely to be cloudy and opaque. On the other hand, the hard coat film obtained from the coating liquid containing composite metal oxide particles whose average particle size is less than 1 nm may have not only such an unsatisfactory hardness as to cause poor scuffing resistance but also an unsatisfactorily high refractive index.

In the iron oxide/titanium oxide compound oxide particles contained in the coating liquid (A), the weight ratio $Fe_2O_3/TiO_2$ is in the range of 0.0005 to less than 0.005, preferably 0.001 to 0.0045, provided that $Fe_2O_3$ and $TiO_2$ represent the weight in terms of $Fe_2O_3$ of the iron oxide component and the weight in terms of $TiO_2$ of the titanium oxide component, respectively.

The weather resistance of obtained coating film is lowered in accordance with the decrease of the iron oxide ratio of the compound oxide. However, as long as the weight ratio $Fe_2O_3/TiO_2$ is at least 0.0005, a hard coat film having practically satisfactory weather resistance can be obtained. Further, when the weight ratio is less than 0.005, the obtained hard coat film is free from being tinted with yellowish hue and also free from exhibiting photochromism.

The above composite metal oxide particles can be those having their surface modified with an organosilicon compound. The modification of the surface of the composite metal oxide particles with an organosilicon compound enables enhancing the reactivity and affinity between the composite metal oxide particles and the matrix-forming component and the affinity between the composite metal oxide particles and the solvent in the coating liquid for forming a hard coat film.

Organosilicon compounds generally known as silane coupling agents are used as the above organosilicon compound, and the appropriate one is selected from among those in conformity with, for example, the types of matrix-forming component and solvent. Examples of the organosilicon compounds include tetraethoxysilane, methyltrimethoxysilane, trimethylchlorosilane, vinyltriethoxysilane, γ-glycidoxypropyltriethoxysilane or γ-glycidoxypropylmethyldiethoxysilane.

The modification of the surface of composite metal oxide particles can be carried out by, for example, the method in which composite metal oxide particles are immersed in an alcohol solution containing the above organosilicon compound for a given period of time and thereafter the solvent is removed, or the method in which an alcohol solution of organosilicon compound is mixed with a composite metal oxide sol and, after a given period of time, the water of the mixture solution is separated and concentrated by ultrafiltration or other means. The amount of added organosilicon compound is appropriately decided on in conformity with, for example, the amount of hydroxyl group present on the surface of compound oxide particles.

Matrix-Forming Component

Matrix-forming components for use in conventional coating liquids for forming a hard coat film can be employed as the matrix-forming component of the coating liquid (A) of the present invention. Examples thereof include hydrolyzable organosilicon compounds, acrylic resins, melamine resins and polyvinyl alcohol resins. Of these, hydrolyzable organosilicon compounds are preferred.

For example, silane compounds of the following general formula (I) are preferably used as the hydrolyzable organosilicon compound.

$$Si(R^1)_a(R^2)_bX_{4-a-b} \qquad (I)$$

wherein each of a and b is an integer of 0 to 2; $R^1$ represents an alkyl, an alkenyl, phenyl or a halogenated hydrocarbon group; $R^2$ represents epoxy, amino, an amido, mercapto, methacryloyl, cyano, vinyl or an organic group containing an aromatic ring having undergone a nucleus substitution with a halogen; and X represents a halogen atom or a hydrolyzable group such as an alkoxyl, an alkoxyalkoxyl or an acyloxy.

Examples of the silane compounds of the above formula (I) include:

tetrafunctional silanes such as tetramethoxysilane and tetraethoxysilane;

trifunctional silanes such as methyltrimethoxysilane, methyltriethoxysilane, γ-chloropropyltrimethoxysilane, γ-methacryloyloxypropyltrimethoxysilane, γ-glycidoxypropyltrimethoxysilane, β-(3,4-epoxycyclohexyl)ethyltrimethoxysilane, γ-mercaptopropyltrimethoxysilane, N-β-(aminoethyl)-γ-aminopropyltrimethoxysilane, γ-ureidopropyltrimethoxysilane, γ-cyanopropyltrimethoxysilane, γ-morpholinopropyltrimethoxysilane and N-phenylaminopropyltrimethoxysilane; and bifunctional silanes substituted one alkoxy group of the above trifunctional silanes with methyl, ethyl, vinyl or other groups.

These organosilicon compounds may be used in combination.

Further, these organosilicon compounds may each be used as it is, or in the form of a partial or entire hydrolyzate, or in the form of a partial polycondensate.

Still further, when the above organosilicon compounds are used as the matrix-forming component, the coating liquid for forming a hard coat film may contain a curing catalyst for accelerating the curing of formed coating film.

Examples of curing catalysts include amines such as n-butylamine, triethylamine and guanidine; amino acids such as glycine; imidazoles such as 2-methylimidazole, 2,4-diethylimidazole and 2-phenylimidazole; metal acetylacetonates such as aluminum acetylacetonate, titanium acetylacetonate and chromium acetylacetonate; metal salts of organic acid such as sodium acetate, zinc naphthenate and tin octylate; Lewis acids such as $SnCl_4$, $TiCl_4$ and $ZnCl_2$; and magnesium perchlorate.

Organic Solvent

Examples of the organic solvents that can be used in the coating liquid for forming a hard coat film (A) include alcohols such as methanol, ethanol and isopropanol; cellosolves such as methyl cellosolve and ethyl cellosolve; glycols such as ethylene glycol; esters such as methyl acetate and ethyl acetate; ethers such as diethyl ether and tetrahydrofuran; ketones such as acetone and methyl ethyl ketone; halogenated hydrocarbons such as dichloroethane; aromatic hydrocarbons such as toluene and xylene; amides such as N,N-dimethylformamide; water and freon. These solvents may be used in combination.

The coating liquid (A) of the present invention contains the above composite metal oxide particles, matrix-forming component and organic solvent. The amount of composite metal particles contained in the coating liquid (A) is preferably in the range of 20 to 500 parts by weight, still preferably 60 to 300 parts by weight, per 100 parts by weight of matrix provided that the amount of iron oxide is one in terms of $Fe_2O_3$ and that the amount of iron oxide is one in terms of $TiO_2$.

Moreover, the coating liquid (A) may contain, for example, a surfactant, an ultraviolet absorber, an antioxidant, a thixotropic agent, a pigment, a dye, an antistatic agent and a conductive material in conformity with the purpose of the formation of the hard coat film, the use of the substrate coated with the hard coat film, etc. The coating liquid (A) may contain polycarboxylic acid such as maleic acid, maleic anhydride, itaconic acid or itaconic anhydride. The dye affinity, heat resistance, resistance to hot water and attrition resistance of the hard coat film can be enhanced when such a polycarboxylic acid is added to the coating liquid (A).

Preparation of Coating Liquid (A)

The method of preparing the above coating liquid for forming a hard coat film (A) is not particularly limited. For example, it can be obtained by homogeneously dispersing or dissolving the above compound oxide particles and matrix-forming component in the organic solvent. A sol of iron oxide/titanium oxide compound oxide dispersed in water or an organic solvent is preferably used as the compound oxide particles. This sol of iron oxide/titanium oxide compound oxide can be produced by conventional methods, for example, the method described in Japanese Patent Laid-open Publication No. 2(1990)-178219.

The method of producing the sol of the composite metal oxide of iron oxide and titanium oxide will be described in more detail below.

(1) First, an aqueous solution of a mixture of a titanium compound and an iron compound is subjected to hydrolysis, thereby obtaining a dispersion containing an iron/titanium composite metal oxide hydrate and/or a mixture of iron oxide hydrate and titanium oxide hydrate.

(2) Subsequently, hydrogen peroxide is added to the dispersion so that the weight ratio of $H_2O_2/(Fe_2O_3+TiO_2)$ is in the range of 4 to 7, and heated at about 50° C. or higher to thereby dissolve or deflocculate the metal oxide hydrate.

(3) The thus obtained solution is heated at 60° C. or higher, preferably 80° C. or higher, with the result that the compound dissolved in hydrogen peroxide is hydrolyzed to thereby enable obtaining a sol of the composite metal oxide composed of iron oxide and titanium oxide.

The coating liquid for forming a hard coat film (A) according to the present invention is obtained by homogeneously dispersing the thus obtained sol of the composite metal oxide of iron oxide and titanium oxide in an organic solvent in which the matrix-forming component has been dissolved or dispersed. The sol of the composite metal oxide of iron oxide and titanium oxide may be used in the form of a water dispersion sol or a dispersion in an organic solvent substituted for water (organosol).

The aforementioned examples of organic solvents can be used as the organic solvent for the mixing with the sol of the composite metal oxide of iron oxide and titanium oxide or for the sol solvent substitution.

Second Coating Liquid for Forming a Hard Coat Film

The second coating liquid for forming a hard coat film according to the present invention (hereinafter referred to as "coating liquid (B)") will be described below.

In this coating liquid (B), the composite metal oxide particles composed of an iron oxide component, a titanium oxide component and a silica component instead of the composite metal oxide particles composed of an iron oxide component and a titanium oxide component used in the coating liquid (A) are used.

Composite Metal Oxide Particle

The terminology "composite metal oxide composed of an iron oxide component, a titanium oxide component and a silica component" used herein means any of the following:

(d) a composite metal oxide consisting of iron oxide, titanium oxide and silica chemically bonded together, (e) a solid solution consisting of oxides of iron, titanium and silicon, and (f) a mixture of substances (d) and (e) mentioned above.

Each of the above iron oxide and titanium oxide may be in the form of a hydrate or a hydroxide, and silica may be silicic anhydride or a hydrate thereof.

The average particle size of these composite metal oxide particles is the same as that of the composite metal oxide particles contained in the coating liquid for forming a hard coat film (A).

In the composite metal oxide particles contained in the coating liquid (B), the weight ratio $Fe_2O_3/TiO_2$ is in the range of 0.0005 to less than 0.005, preferably 0.001 to 0.0045, and the weight ratio $SiO_2/(Fe_2O_3+TiO_2)$ is in the range of 0.001 to 1.0, preferably 0.005 to 0.8, provided that $Fe_2O_3$, $TiO_2$ and $SiO_2$ represent the weight in terms of $Fe_2O_3$ of iron oxide, the weight in terms of $TiO_2$ of titanium oxide and the weight in terms of $SiO_2$ of silica, respectively.

When the silica component is contained in the above range in the composite metal oxide particles, the long-term stability of the coating liquid and the weather resistance of the obtained hard coat film can be enhanced. However, when the weight ratio $SiO_2/(Fe_2O_3+TiO_2)$ exceeds 1.0, the refractive index of the hard coat film may be unfavorably lowered. On the other hand, when the weight ratio is less than 0.001, there is hardly any effect of containing the silica component exerted.

These composite metal oxide particles may have their surface modified with an organic silane compound in the same manner as aforementioned. Those set forth hereinbefore can be used as the organic silane compound.

The coating liquid for forming a hard coat film (B) according to the present invention is produced in the same manner as the coating liquid (A), except that fine particles of the composite metal oxide of iron oxide, titanium oxide and silica are used in place of fine particles of the composite metal oxide of iron oxide and titanium oxide. The sol of composite metal oxide of iron oxide, titanium oxide and silica used in the production of the coating liquid (B) can be prepared by conventional methods, for example, the method described in Japanese Patent Laid-open Publication No. 2(1990)-178219 as employed in the above-mentioned production of the sol of composite metal oxide of iron oxide and titanium oxide.

Substrate Coated with Hard Coat Film

The substrate coated with a hard coat film according to the present invention will be described below.

The substrate coated with a hard coat film according to the present invention has a hard coat film formed on a substrate surface by applying the above coating liquid for forming a hard coat film (A) or (B) thereto.

As substrates, glasses, plastics and other materials can be used. Examples thereof include spectacle lenses, various optical lenses for cameras and other instruments, CRT front panels, optical filters, show window cases, window glasses, contact glasses for copier, automobile light covers and various ultraviolet screening filters.

The hard coat film can be formed on the above substrates by conventional methods, for example, the method in which the substrate surface is coated with the coating liquid (A) or (B) by dipping, spinner, spray, roll coater, flexographic printing or other technique, dried and heated at temperatures which should not exceed the heat resistance temperature of the substrate so as to effect curing.

The substrate coated with a hard coat film according to the present invention may have its hard coat film overcoated with an antireflection film.

The antireflection film can be formed on the hard coat film by conventional methods, for example, the method in which, after the above coating liquid application, drying and curing, a plurality of components with refractive indices different from each other are alternately laminated onto the hard coat film by vacuum deposition.

It is generally preferred that the thickness of the antireflection film thus formed on the substrate coated with the hard coat film be in the range of 0.1 to 20 $\mu$m, especially 1 to 7 $\mu$m.

The use of the coating liquid for forming a hard coat film according to the present invention enables forming a hard coat film with high refractive index on the surface of a substrate such as a plastic lens.

For example, a plastic lens with a hard coat film formed by applying the coating liquid of the present invention onto the surface of a lens composed of a plastic base material with high refractive index is free from any interference fringe attributed to a refractive index difference between the plastic lens and the hard coat film. The hard coat film on the plastic lens is free from discoloration by light irradiation attributed to photochromism.

Further, the thus formed hard coat film is excellent in weather resistance, and has a high surface hardness to thereby ensure excellent scuffing resistance and attrition resistance. The hard coat film does not have photochromism, so that it is free from discoloration by light irradiation. The hard coat film has also excellent dye affinity. Therefore, the hard coat film is preferably used on spectacle lenses and various optical lenses for cameras and other devices. For example, cameras and other image pickup devices fitted with a lens having its surface coated with the above hard coat film are advantageous over those fitted with a lens having its surface not coated with the hard coat film in that, for example, clear images can be picked up with less quantity of light.

Still further, the formation of this hard coat film on the surface of, for example, a show window or a window glass enables obtaining a coated substrate with excellent transparency and excellent ultraviolet screening effect. Thus, it enables not only prolonging the life of the coated substrate but also preventing the sunburn of items placed inside the show window, etc.

Still further, the formation of this hard coat film on the surface of a light cover of, for example, an automobile is effective in increasing the degree of light focusing because of the high refractive index to thereby increase brightness.

The coating liquid for forming a hard coat film according to the present invention can be applied to not only the surface of a glass substrate but also the surface of a plastic substrate composed of, for example, a polycarbonate resin, an acrylic resin, a polystyrene resin, a polyester resin or a polyurethane resin to thereby form hard coat films. These hard coat films are suitable to use for an ultraviolet screening.

Moreover, the coating liquid for forming a hard coat film according to the present invention is suitable for not only the formation of the hard coat film but also the formation of a primer layer with high refractive index of a lens with high refractive index.

For example, the plastic lens is generally highly resistant to impact. However, the lens for high refractive index has a small thickness, so that the impact resistance thereof is poor. The lens having high refractive index comprises a lens having its surface coated with a hard coat film with high refractive index, this hard coat film overcoated with a film with low refractive index. The film with low refractive index is generally formed by vapor deposition or the like. The formation of the film with the low refractive index causes the lens to strain with the result that the impact resistance of the lens is sharply decreased and results in the lens cracking.

For preventing the lens cracking attributed to the decrease of the impact resistance, it is required to interpose a primer layer for impact absorption between the lens and the hard coat film. When the refractive index of the primer layer is lower than the refractive index of the lens, there may occur an interference fringe of light attributed to the primer layer. For avoiding this interference fringe, it is required to form a primer layer having the same high level of refractive index as that of the lens. The coating liquid for forming a hard coat film according to the pre sent invention is suitable to use as the coating liquid for forming the above primer layer with high refractive index.

EXAMPLES

The present invention is now illustrated with reference to the following Examples, but such examples in no way limit the scope of the invention.

Example 1

Preparation of Sol of Iron Oxide/Titanium Oxide Compound Oxide 0.2 part by weight, in terms of $Fe_2O_3$, of ferric chloride and 99.8 parts by weight, in terms of $TiO_2$, of titanium tetrachloride were dissolved in pure water, thereby obtaining 10,000 parts by weight of an aqueous solution of mixture. 15% aqueous ammonia was slowly added to the aqueous solution of mixture until the pH thereof became 9.0, thereby obtaining a co-precipitate gel of iron oxide hydrate and titanium oxide hydrate.

The thus obtained co-precipitate gel was dehydrated and washed. 1150 parts by weight of 35% hydrogen peroxide and 250 parts by weight of pure water were added to 1100 parts by weight of the co-precipitate gel, and heated to 80° C. Asia result, a reddish-brown solution was obtained. This solution was diluted with pure water so that the concentration of iron and titanium oxides contained in the solution, in terms of ($TiO_2+Fe_2O_3$), became 1.0% by weight, and heated at 200° C. for 9 hr in an autoclave.

Thereafter, the water of the solution was replaced by methanol, and the mixture was concentrated until the concentration in terms of ($TiO_2+Fe_2O_3$) became 20% by weight. Thus, there was obtained a sol of composite metal oxide of iron oxide and titanium oxide (sol $A_1$) having an average particle size of 11 nm and a weight ratio $Fe_2O_3/TiO_2$ of 1/499.

Preparation of Coating Liquid for Forming Hard Coat Film 64.2 parts by weight of a 0.01 N aqueous solution of HCl was slowly dropped under agitation into a reaction vessel in which 276.1 parts by weight of γ-glycidoxypropyltrimethoxysilane had been placed while maintaining the temperature of the reaction vessel at 10° C., thereby hydrolyzing the γ-glycidoxypropyltrimethoxysilane. 100.2 parts by weight of ethanol and 215 parts by weight of isopropanol were added to the resultant solution, thereby obtaining a matrix-forming component. 1173.4 parts by weight of the above sol $A_1$ was added to the liquid containing the matrix-forming component, and further 10.03 parts by weight of aluminum acetylacetonate was added thereto. The resultant liquid was mixed well, thereby obtaining a coating liquid for forming a hard coat film.

Formation of Hard Coat Film

Resin-made lens substrate (MR-6 produced by Mitsui Chemicals, Inc., having a refractive index of 1.60) was immersed in a 13% aqueous solution of NaOH at 47° C. for some minutes, and washed well with water.

The washed substrate was immersed in the above coating liquid, lifted at a speed of 80 mm/min, dried at 90° C. for 18 min, and heated at 104° C. for 90 min to effect curing. Thus, a hard coat film was formed.

Formation of Antireflection Film (Multicoat Layer)

The substrate coated with the hard coat film, formed in the above manner, was exposed to argon plasma of 200 W output in vacuum for 30 sec, and sequentially overcoated with five thin films respectively composed of $SiO_2$, $ZrO_2$, $SiO_2$, $ZrO_2$ and $SiO_2$ by vacuum evaporation so that an antireflection film was formed. The optical thickness of this antireflection film was such that, setting the design wavelength (λ) at 510 nm, the thickness of each of the first ($SiO_2$), fourth (ZrO) and fifth ($SiO_2$) layers was about ¼ λ and the total of the thicknesses of the second (ZrO) and third ($SiO_2$) layers was about ¼ λ.

Property of Hard Coat Film

The following properties of the thus obtained hard coat film coated substrate were evaluated.

(a) Photochromism (a-1) Hard Coat Film not Having Antireflection Coating

The substrate with hard coat film was subjected to exposure for 200 hr in sunshine weather meter (manufactured by Suga Test Instruments Co., Ltd.). Immediately thereafter, the appearance thereof was observed to evaluate the occurrence of coloring.

No coloring perceived: no photochromism, and coloring perceived: presence of photochromism.

(a-2) Hard Coat Film Having Antireflection Coating

The substrate with hard coat film was subjected to exposure for 200 hr in sunshine weather meter (manufactured by Suga Test Instruments Co., Ltd.). Thereafter, while allowing the substrate to stand still in a dark room, the average transmission of visible radiation was measured 1 min later, 10 min later, 30 min later, 1 hr later, 3 hr later, 6 hr later, 1 day later, 3 days later and 6 days later by the use of spectrophotometer (Ubest V-550, manufactured by Japan Spectroscopic-Co., Ltd.). Thus, the level of coloring was evaluated through the change of transmission with the passage of time. The above average transmission mm means the average of all light transmissions over the wavelength range of 400 to 780 nm.

(b) High Refractivity

"o" was assigned when the refractive index obtained as a result of analysis of the reflection interference spectrum of the surface of hard coat film was 1.58 or over.

(c) Scuffing Resistance

Steel wool was reciprocated 10 times under a load of 2 kg on the surface of a 1 cm×3 cm test piece having the hard coat film so that the hard coat film was abraded with the steel wool. The degree of marring was visually evaluated into the following grades:

A: substantially not marred,

B: slightly marred, and

C: extremely marred.

(d) Appearance

"o" was assigned when the substrate with hard coat film was highly transparent and the coloring thereof was very slight.

(e) Dye Affinity

The substrate with hard coat film was immersed for 5 min in 92° C. water in which three disperse dyes, viz. red, blue and yellow disperse dyes, had been dissolved. With respect to the hard coat film coated substrate, the extinction coefficient at 550 nm wavelength was measured by means of SM color computer (manufactured by Suga Test Instruments Co., Ltd.), and the following evaluation was made:

o: at least 30% extinction coefficient,

Δ: 20% to less than 30% extinction coefficient, and x: less than 20% extinction coefficient.

(f) Weather Resistance

The hard coat film coated substrate was subjected to an accelerated exposure test for 400 hr by means of weather meter (manufactured by Suga Test Instruments Co., Ltd.), and the appearance of substrate with hard coat film and adherence of hard coat film were evaluated.

(f-1) Appearance: The Occurrence of Coloring was Evaluated.

(f-2) Adherence: The exposed lens was immersed in 80° C. water for 2 hr, and 11 parallel cuts were made at intervals of 1 mm in both longitudinal and lateral directions on the lens surface with the use of a knife to thereby form 100 meshes of coating film. A cellophane tape was stuck thereto and stripped off. The adherence was evaluated on the basis of the number of meshes of coating film remaining unstripped into the following two grades:

o: at least 95 meshes of coating film remaining unstripped, and x: 94 or less meshes of coating film remaining unstripped.

(g) Cloudiness

The substrate with hard coat film was arranged 0.20 between a black background and a 3-wavelength-type daylight fluorescent lamp, and the pattern of light having been transmitted through the substrate with hard coat film and reflected upon the background was visually inspected. The, cloudiness was evaluated on the basis of the occurrence and degree of pattern into two grades o and x.

(h) Long-Term Stability

The coating liquid for forming a hard coat film was-stored at 10° C. for 25 days or 45 days. After the storage, the hard coat film was formed in the above manner, and the properties thereof were measured with respect to five items, viz. items (b) to (e) and (g) mentioned above. The long-term stability was evaluated, the difference between the hard coat film formed from the stored coating liquid and the hard coat film formed from the coating liquid immediately after production with respect to these items, into the following three grades:

o: no difference with respect to all the items,

Δ: difference found with respect to one or two among the five items, and x: difference found with respect to 3 or more items.

The results are given in Table 1. With respect to the hard coat film having the antireflection coating, the change of average transmission after light irradiation with the passage of time is shown in FIG. 1.

Comparative Example 1

A sol of the composite metal oxide of iron oxide and titanium oxide having an average particle size of 9 nm (sol $B_1$) was produced in the same manner as in Example 1, except that the amounts of ferric chloride and titanium tetrachloride were regulated so that $Fe_2O_3/TiO_2$ (reduced weight ratio) became 2/98.

A coating liquid for forming a hard coat film was prepared in the same manner as in Example 1, except that the sol $B_1$ was used in place of the sol $A_1$. A hard coat film was formed from the coating liquid, and evaluated, in the same manner as in Example 1.

The results are shown in Table 1 and FIG. 1.

Example 2

1000 parts by weight of sol $A_1$ was placed in a reaction vessel and heated to 63° C. 2000 parts by weight of a solution of a mixture of vinyltriethoxysilane and methanol was slowly added thereto under agitation. After the completion of the addition, the sol of the composite metal oxide of iron oxide and titanium oxide contained in the solution was aged while maintaining the temperature of the solution at 63° C., and the solution was concentrated. Thus, there was obtained a methanol dispersed sol of iron oxide/titanium oxide compound oxide having its surface modified with vinyltriethoxysilane (concentration: 30.5% by weight, sol $A_2$).

A coating liquid for forming a hard coat film was prepared in the same manner as in Example 1, except that the sol $A_2$ was used in place of the sol $A_1$. A hard coat film and a hard coat film having an antireflection coating were formed from the coating liquid, and evaluated, in the same manner as in Example 1.

The results are shown in Table 1 and FIG. 1.

Example 3

A silicic acid solution (concentration in terms of $SiO_2$: 5% by weight) prepared by dealkalizing an aqueous solution of water glass by the use of a cation exchange resin in advance was mixed with the reddish-brown solution obtained during the process of preparing the sol of the composite metal oxide of iron oxide and titanium oxide in Example 1 in a weight ratio $SiO_2/(Fe_2O_3+TiO_2)$, wherein $Fe_2O_3$, $TiO_2$ and $SiO_2$ represent the amount in terms of $Fe_2O_3$ of iron oxide component, the amount in terms of $TiO_2$ of titanium oxide component and the amount in terms of $SiO_2$ of silica component, respectively, of 15/100. Thereafter, the mixture was heated at 170° C. for 10 hr in an autoclave.

Thereafter, the water of the solution was replaced by methanol, and the mixture was concentrated until the concentration in terms of $(Fe_2O_3+TiO_2+, SiO_2)$ became 20% by weight. Thus, there was obtained a sol of the composite metal oxide of iron oxide, titanium oxide and silica having an average particle size of 11 nm (sol $C_1$).

A coating liquid for forming a hard coat film was prepared in the same manner as in Example 1, except that the sol $C_1$ was used in place of the sol $A_1$. Further, a hard coat film and a hard coat film having an antireflection coating were formed from the coating liquid, and the properties thereof were evaluated, in the same manner as in Example 1.

The results are shown in Table 1 and FIG. 1.

Example 4

A sol of the composite metal oxide of iron oxide and titanium oxide having an average particle size of 10 nm (sol $D_1$) was produced in the same manner as in Example 1, except that the amounts of ferric chloride and titanium tetrachloride were regulated so that $Fe_2O_3/TiO_2$ (weight ratio) became 1/999.

A coating liquid for forming a hard coat film was prepared in the same manner as in Example 1, except that the sol $D_1$ was used in place of the sol $A_1$. Further, a hard coat film and a hard coat film having an antireflection coating were formed from the coating liquid, and the properties thereof were evaluated, in the same manner as in Example 1.

The results are shown in Table 1 and FIG. 1.

TABLE 1

| | Sol | | | High | | | | Weather resistance | | | Stability | |
| | Fe$_2$O$_3$/TiO$_2$ | SiO$_2$/(Fe$_2$O$_3$ + TiO$_2$) | Photo-chromism | refract-ivity | Scuffing resistance | Appear-ance | Dye affinity | coloring | adherence | Cloudi-ness | 25 days | 45 days |
|---|---|---|---|---|---|---|---|---|---|---|---|---|
| Example 1 | 1/499 | — | none | ○ | A | ○ | ○ | none | ○ | ○ | ○ | x |
| Comp. Ex. 1 | 2/98 | — | exhibited | ○ | A | ○ | ○ | occurred | ○ | ○ | ○ | x |
| Example 2 | 1/499 | — | none | ○ | A | ○ | ○ | none | ○ | ○ | ○ | Δ |
| Example 3 | 1/499 | 15/100 | none | ○ | A | ○ | ○ | none | ○ | ○ | ○ | ○ |
| Example 4 | 1/999 | — | none | ○ | A | ○ | ○ | none | ○ | ○ | ○ | x. |

What is claimed is:

1. A coating liquid for forming a hard coat film, comprising a matrix-forming component and particles of a composite metal oxide, wherein the composite metal oxide particles are composed of an iron oxide component and a titanium oxide component, the weight ratio Fe$_2$O$_3$/TiO$_2$ being in the range of 0.0005 to less than 0.005, provided that Fe$_2$O$_3$ and TiO$_2$ represent the weight in terms of Fe$_2$O$_3$ of the iron oxide component and the weight in terms of TiO$_2$ of the titanium oxide component, respectively, wherein the composite metal oxide particles have an average particle size ranging from 1 to 100 nm, and said film exhibits no perceived photochromism or coloration from weathering.

2. The coating liquid for forming a hard coat film as claimed in claim 1, wherein the composite metal oxide particles have their surface modified with an organosilicon compound.

3. The coating liquid of claim 1, wherein the weight ratio Fe$_2$O$_3$/TiO$_2$ is in the range of 0.001 to 0.0045.

4. A substrate coated with a hard coat film, which is formed by applying to the substrate surface the coating liquid for forming a hard coat film as claimed in claim 2.

5. The substrate coated with a hard coat film as claimed in claim 4, wherein the hard coat film has its surface overcoated with an antireflection film.

6. A substrate coated with a hard coat film, which is formed by applying to the substrate surface the coating liquid for forming a hard coat film as claimed in claim 1.

7. The substrate coated with a hard coat film as claimed in claim 6, wherein the hard coat film has its surface overcoated with an antireflection film.

8. A coating liquid for forming a hard coat film, comprising a matrix-forming component and particles of a composite metal oxide, wherein the composite metal oxide particles are composed of iron oxide, titanium oxide and silica, the weight ratio Fe$_2$O$_3$/TiO$_2$ being in the range of 0.0005 to less than 0.005, and the weight ratio SiO$_2$/(Fe$_2$O$_3$+TiO$_2$) being in the range of 0.001 to 1.0, provided that Fe$_2$O$_3$, TiO$_2$ and SiO$_2$ represent the weight in terms of Fe$_2$O$_3$ of iron oxide, the weight n terms of TiO$_2$ of titanium oxide and the weight in terms of SiO$_2$ of silica, respectively, wherein the composite metal oxide particles have an average particle size ranging from 1 to 100 nm, and said film exhibits no perceived photochromism or coloration from weathering.

9. The coating liquid of claim 8, wherein the weight ratio Fe$_2$O$_3$/TiO$_2$ is in the range of 0.001 to 0.0045.

10. The coating liquid for forming a hard coat film as claimed in claim 8, wherein the composite metal oxide particles have their surface modified with an organosilicon compound.

11. A substrate coated with a hard coat film, which is formed by applying to the substrate surface the coating liquid for forming a hard coat film as claimed in claim 10.

12. The substrate coated with a hard coat film as claimed in claim 11, wherein the hard coat film has its surface overcoated with an antireflection film.

13. A substrate coated with a hard coat film, which is formed by applying to the substrate surface the coating liquid for forming a hard coat film as claimed in claim 8.

14. The substrate coated with a hard coat film as claimed in claim 13, wherein the hard coat film has its surface overcoated with an antireflection film.

* * * * *